United States Patent
Kruglick

(10) Patent No.: US 9,965,310 B2
(45) Date of Patent: May 8, 2018

(54) VIRTUAL MACHINE EXIT ANALYZER

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 162 days.

(21) Appl. No.: 14/906,752

(22) PCT Filed: Aug. 28, 2013

(86) PCT No.: PCT/US2013/057010
§ 371 (c)(1),
(2) Date: Jan. 21, 2016

(87) PCT Pub. No.: WO2015/030746
PCT Pub. Date: Mar. 5, 2015

(65) Prior Publication Data
US 2016/0162318 A1    Jun. 9, 2016

(51) Int. Cl.
*G06F 9/46* (2006.01)
*G06F 9/455* (2006.01)

(52) U.S. Cl.
CPC ...... *G06F 9/45558* (2013.01); *G06F 9/45533* (2013.01); *G06F 2009/45575* (2013.01); *G06F 2009/45583* (2013.01); *Y02B 60/146* (2013.01); *Y02B 60/148* (2013.01)

(58) Field of Classification Search
None
See application file for complete search history.

(56) References Cited

U.S. PATENT DOCUMENTS

| | | | |
|---|---|---|---|
| 7,418,584 B1 * | 8/2008 | Klaiber | G06F 9/45533 712/229 |
| 7,886,293 B2 | 2/2011 | Anderson et al. | |
| 7,992,147 B2 | 8/2011 | Galal et al. | |
| 2005/0204357 A1 * | 9/2005 | Garg | G06F 9/4426 718/1 |

(Continued)

FOREIGN PATENT DOCUMENTS

WO    2007092951 A2    8/2007

OTHER PUBLICATIONS

"Advancing the Performance and Scalability of I/O in Multi-core Platforms," IOLanes, pp. 1-4 (Sep. 22, 2012).

(Continued)

*Primary Examiner* — Bradley Teets

(57) ABSTRACT

Technologies are generally described for systems, devices and methods effective to implement a virtual machine exit analyzer. A virtual machine handler may receive a request that includes an instruction. The instruction may include a port and a data block identifier. The virtual machine handler may generate a modified request. The modified request may include the port, a block portion identifier and an identification of a comparator. The virtual machine handler may send values identified by the block portion identifier to the comparator. The virtual machine handler may receive an exit indicator from the comparator that indicates whether the virtual machine should exit the core.

17 Claims, 5 Drawing Sheets

(56) References Cited

U.S. PATENT DOCUMENTS

| | | | |
|---|---|---|---|
| 2005/0223220 A1* | 10/2005 | Campbell | G06F 9/45537 713/164 |
| 2006/0026384 A1* | 2/2006 | Brandt | G06F 9/4843 711/209 |
| 2008/0115115 A1 | 5/2008 | Codrescu et al. | |
| 2008/0271014 A1 | 10/2008 | Serebrin et al. | |
| 2008/0288940 A1 | 11/2008 | Adams et al. | |
| 2009/0037936 A1* | 2/2009 | Serebrin | G06F 12/0292 719/318 |
| 2009/0187697 A1* | 7/2009 | Serebrin | G06F 9/455 711/6 |
| 2009/0187698 A1* | 7/2009 | Serebrin | G06F 9/455 711/6 |
| 2009/0187726 A1* | 7/2009 | Serebrin | G06F 9/455 711/202 |
| 2009/0187729 A1* | 7/2009 | Serebrin | G06F 9/455 711/206 |
| 2009/0187904 A1* | 7/2009 | Serebrin | G06F 9/455 718/1 |
| 2010/0223447 A1* | 9/2010 | Serebrin | G06F 12/0253 712/225 |
| 2011/0113467 A1 | 5/2011 | Argarwal et al. | |
| 2011/0246171 A1 | 10/2011 | Cleeton et al. | |
| 2014/0245444 A1* | 8/2014 | Lutas | G06F 12/109 726/24 |
| 2014/0331224 A1* | 11/2014 | Robenko | G06F 9/45533 718/1 |

OTHER PUBLICATIONS

"Intel® Virtualization Technology: Demo," accessed at web.archive.org/web/20130303111720/http://www.intel.com/content/www/us/en/virtualization/virtualization-technology/intel-virtualization-technology.html, accessed on Jan. 29, 2015, pp. 2.

"VMware Aware SSD Caching," accessed at youtube.com/watch?v=o39rcOzyxKQ, accessed on Jan. 29, 2015, pp. 2.

Agesen, O., et al., "Software Techniques for Avoiding Hardware Virtualization Exits," VMware Technical Report, pp. 1-13 (Aug. 2011).

Biswas, K., and Islam, M.A., "Hardware Virtualization Support in Intel, AMD and IBM Power Processors," International Journal of Computer Science and Information Security, vol. 4, No. 1 and 2, pp. 1-6 (2009).

Gerzon, G., "Intel® Virtualization Technology Processor Virtualization Extensions and Intel® Trusted execution Technology," accessed at web.archive.org/web/20150125191306/https://software.intel.com/file/1024, accessed on Jan. 29, 2015, pp. 53.

Gleed, K., "What's in a VIB?," accessed at web.archive.org/web/20130508151559/http://blogs.vmware.com/vsphere/2011/09/whats-in-a-vib.html, posted on Sep. 13, 2011, pp. 3.

Hunsaker, C., "Password Breach? That'll Be $172,000,000 Please," accessed at stormpath.com/blog/password-breach-thatll-be-172000000-please/, posted on Jan. 25, 2013, pp. 1-4.

International Search Report and Written Opinion for counterpart International Patent Application No. PCT/US2013/057010 dated Mar. 17, 2014, 25 pages.

Kessler, R.E., "Cavium 32 Core OCTEON II CN68xx," Hot Chips 23, pp. 1-33 (Aug. 2011).

Liu, S., and Kuhn, R., "Data Loss Prevention," IEEE computer society, vol. 12, No. 2, pp. 10-13 (Mar.-Apr. 2010).

Ouellet, E., and McMillan, R., "Magic Quadrant for Content-Aware Data Loss Prevention," accessed at web.archive.org/web/20150129101200/http://www.calderoncardona.com/wp-content/uploads/2011/09/GARTNER_DLP.pdf, posted on Aug. 10, 2011, p. 1.

Rooney, P., "Bromium ships vSentry micro-hypervisor for foolproof Windows 7 security," accessed at zdnet.com/article/bromium-ships-vsentry-micro-hypervisor-for-foolproof-windows-7-security/, posted on Sep. 20, 2012, pp. 1-4.

Seshadri, A., et al., "SecVisor: a tiny hypervisor to provide lifetime kernel code integrity for commodity OSes," Proceedings of twenty-first ACM SIGOPS symposium on Operating systems principle, vol. 41, No. 6, pp. 335-350 (Dec. 2007).

Zabalj'Auregui, M., "Hardware Assisted Virtualization Intel Virtualization Technology," accessed at linux.linti.unlp.edu.ar/images/f/f1/Vtx.pdf, pp. 1-54 (2008).

* cited by examiner

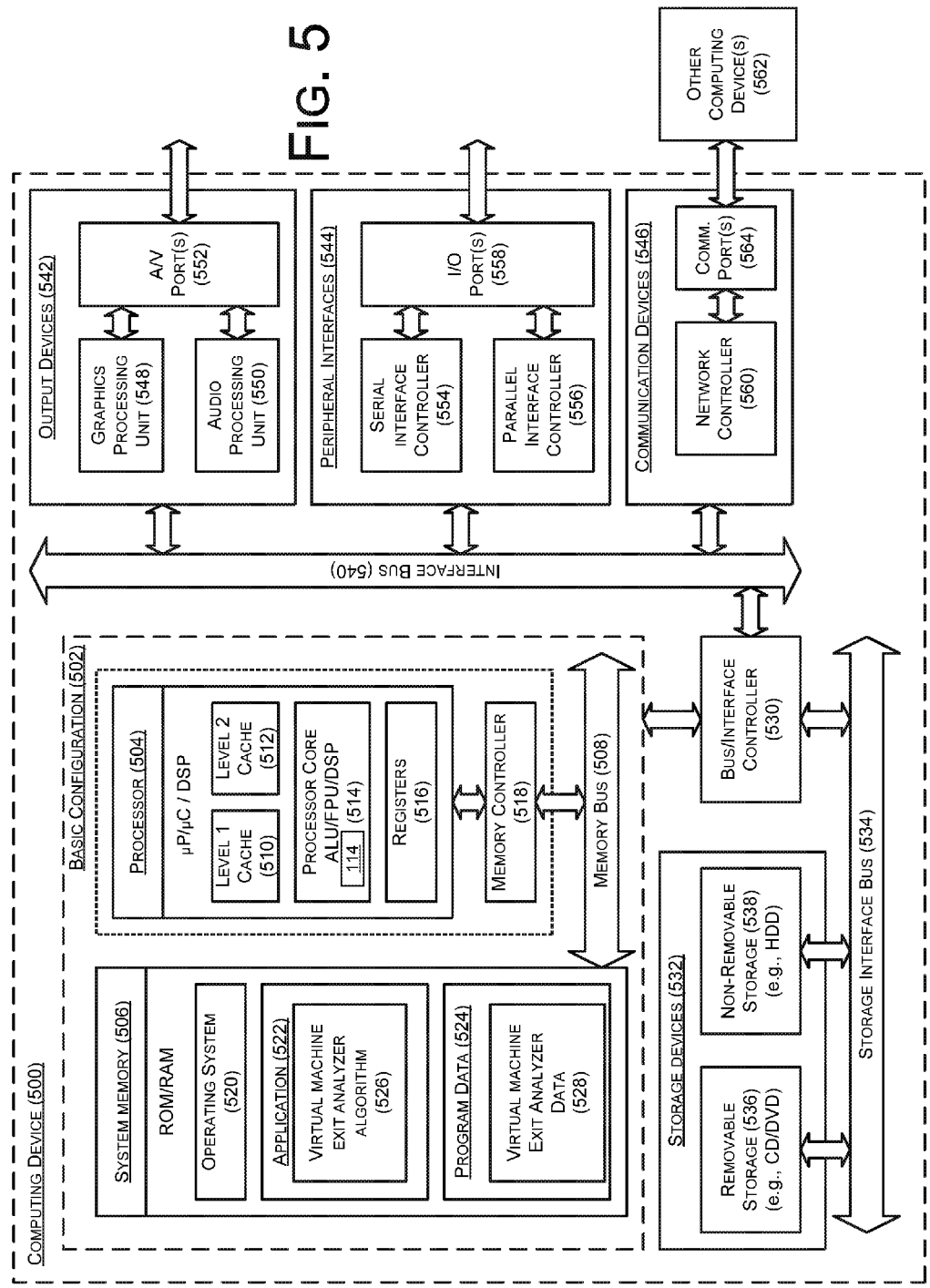

VIRTUAL MACHINE EXIT ANALYZER

CROSS-REFERENCE TO RELATED APPLICATION

This application is a U.S. National stage filing under 35 U.S.C. § 371 of International Application No. PCT/US2013/57010, filed on Aug. 28, 2013. The disclosure of International Application No. PCT/US2013/57010 is hereby incorporated by reference in its entirety.

BACKGROUND

Unless otherwise indicated herein, the materials described in this section are not prior art to the claims in this application and are not admitted to be prior art by inclusion in this section.

One or more virtual machines may be executed by a processor. A virtual machine may be a software instantiation of a computing environment or operating system. Virtual machines may emulate the architecture and or the functions of a physical machine. A request for execution of certain instructions by a virtual machine may result in the processor stopping execution of the virtual machine, or a virtual machine exit.

SUMMARY

In one example, methods for determining whether a virtual machine being executed by a core should exit the core are generally described. The methods may include receiving a request by a virtual machine handler. The request may include an instruction. The instruction may include a port and a data block identifier. The methods may further include generating a modified request. The modified request may include the port, a block portion identifier and an identification of a comparator. The methods may further include sending values identified by the block portion identifier to the comparator. The methods may further include receiving an exit indicator from the comparator. The exit indicator may indicate whether the virtual machine should exit the core.

In one example, methods for determining whether a virtual machine being executed by a core should exit the core are generally described. The methods may include, by a virtual machine handler, receiving a request by the virtual machine. The request may include an instruction. The instruction may include a port and a data block identifier. The methods may further include, by the virtual machine handler, generating a modified request. The modified request may include the port, a block portion identifier and an identification of a comparator. The methods may further include, by the virtual machine handler, sending values identified by the block portion identifier to the comparator. The methods may further include, by a comparator, comparing the values identified by the block portion identifier with a list of allowed values. The methods may further include, by the comparator, generating an exit indicator. The exit indicator may indicate that the virtual machine should not exit the core when the values identified by the block portion identifier matches the allowed values. The methods may further include, by the comparator, sending the exit indicator to the virtual machine handler. The methods may further include, by the virtual machine handler, receiving the exit indicator from the comparator.

In one example, processors are generally described. The processors may include a core. The core may include a virtual machine handler. The core may be effective to execute a virtual machine. The processors may further include a buffer. The virtual machine handler may be effective to receive a request that relates to an instruction. The instruction may include a port and a data block identifier. The virtual machine handler may be further effective to store the instruction in the buffer. The virtual machine handler may be further effective to generate a modified request. The modified request may include the port, a block portion identifier and an identification of a comparator. The virtual machine handler may be further effective to send values identified by the block portion identifier to the comparator. The virtual machine handler may be further effective to receive an exit indicator from the comparator. The exit indicator may indicate whether the virtual machine should exit the core.

In one example, methods for a virtual machine manager to program a virtualization hardware to determine whether a virtual machine should exit a core are generally described. The methods may include instructing a virtual machine handler to receive a request by a virtual machine manager. The request may relate to an instruction. The instruction may include a port and a data block identifier. The methods may further include instructing the virtual machine handler to generate a modified request. The modified request may include the port, a block portion identifier and an identification of a comparator. The methods may further include instructing the virtual machine handler to send values identified by the block portion identifier to the comparator. The methods may further include instructing the virtual machine handler to receive an exit indicator from the comparator. The exit indicator may indicate whether the virtual machine should exit the core.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 is a block diagram illustrating an example computing device that is arranged to implement a virtual machine exit analyzer; all arranged according to at least some embodiments described herein.

DETAILED DESCRIPTION

Figure 1:
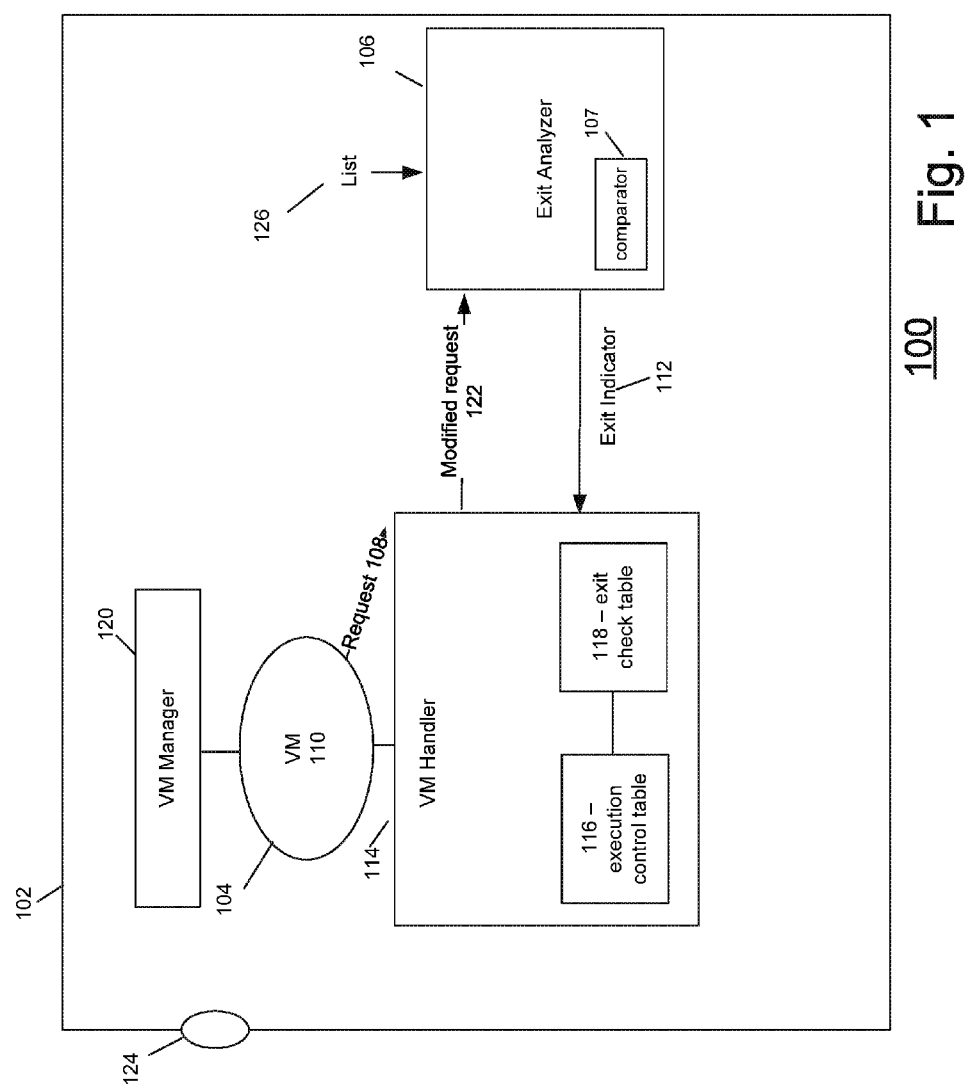
FIG. 1 illustrates an example system that can be utilized to implement a virtual machine exit analyzer.

In the following detailed description, reference is made to the accompanying drawings, which form a part hereof In the drawings, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

This disclosure is generally drawn to, inter alia, methods, apparatus, systems, devices, and computer program products related to a virtual machine exit analyzer.

Briefly stated, technologies are generally described for systems, devices and methods effective to implement a virtual machine exit analyzer. A virtual machine handler may receive a request that includes an instruction. The instruction may include a port and a data block identifier. The virtual machine handler may generate a modified request. The modified request may include the port, a block portion identifier and an identification of a comparator. The virtual machine handler may send values identified by the block portion identifier to the comparator. The virtual machine handler may receive an exit indicator from the comparator that indicates whether the virtual machine should exit the core.

FIG. 1 illustrates an example system that can be utilized to implement a virtual machine exit analyzer in accordance with at least some embodiments described herein. An example system 100 may include a processor 102. Processor 102 may include one or more cores 104. Core 104 may execute one or more virtual machines 110. A virtual machine may be, for example, a software instantiation of a computing environment. Virtual machines may be based on specifications of a hypothetical computing environment or emulate computer architecture and functions of a physical computer. Virtual machine 110 may execute one or more instructions. Processor 102 may include one or more virtual machine managers 120. Virtual machine manager 120 may be, for example, hardware and/or some combination of hardware and instructions executable on the hardware and may be used to instantiate and/or control virtual machines 110. In examples where virtual machine manager 120 includes executable instructions, core 104 may execute virtual machine manager 120. Processor 102 may include one or more virtual machine handlers ("VM Handler") 114. Virtual machine handler 114 may be hardware inside or outside of core 104 and may monitor instructions requested to be executed by virtual machine 110. Virtual machine handler 114 may be configured to store control data related to instructions executed by virtual machine 110. Virtual machine handler 114 may receive and trap certain instructions executed by virtual machine 110 relating to ports 124 of processor 102. Virtual machine handler 114 may be controlled by virtual machine manager 120.

Virtual machine handler 114 may include one or more virtual machine execution control tables 116 and/or one or more virtual machine exit check tables 118. Virtual machine execution control table 116 and virtual machine exit check table 118 may be data structures stored in a memory associated with virtual machine handler 114, such as in a cache or in one or more registers or main memory. A request 108 may be generated by virtual machine 110. Request 108 may be a request to execute certain instructions. Example requests may include requesting access to input data to, or receive data from, a particular port 124 of processor 102.

As will be discussed in more detail below, exit analyzer 106 may be used to produce an exit indicator 112. In brief, request 108 may be trapped by virtual machine handler 114. Virtual machine handler 114 may compare request 108 with data in virtual machine execution control table 116 and virtual machine execution check table 118. In response to the analysis, virtual machine handler 114 may generate and send a modified request 122 to exit analyzer 106. Exit analyzer 106 may include a comparator 107. Exit analyzer 106 may compare the values identified in modified request 122 with a list 126 of allowed values using the identified comparator 107. Allowed values may be, for example, a list of allowed network addresses or a list of data and/or data structures which may be allowed to be written to a port. In response to the analysis, exit analyzer 106 may generate exit indicator 112. Exit indicator 112 may be a Boolean value that indicates whether virtual machine 110 should exit core 104. The values identified in modified request 122 may be, for example, related to a request to send data to a particular network address. In another example, the values in modified request 122 may be related to a request to store particular content such as a credit card number or a social security number in a digital loss prevention scenario.

Figure 2:
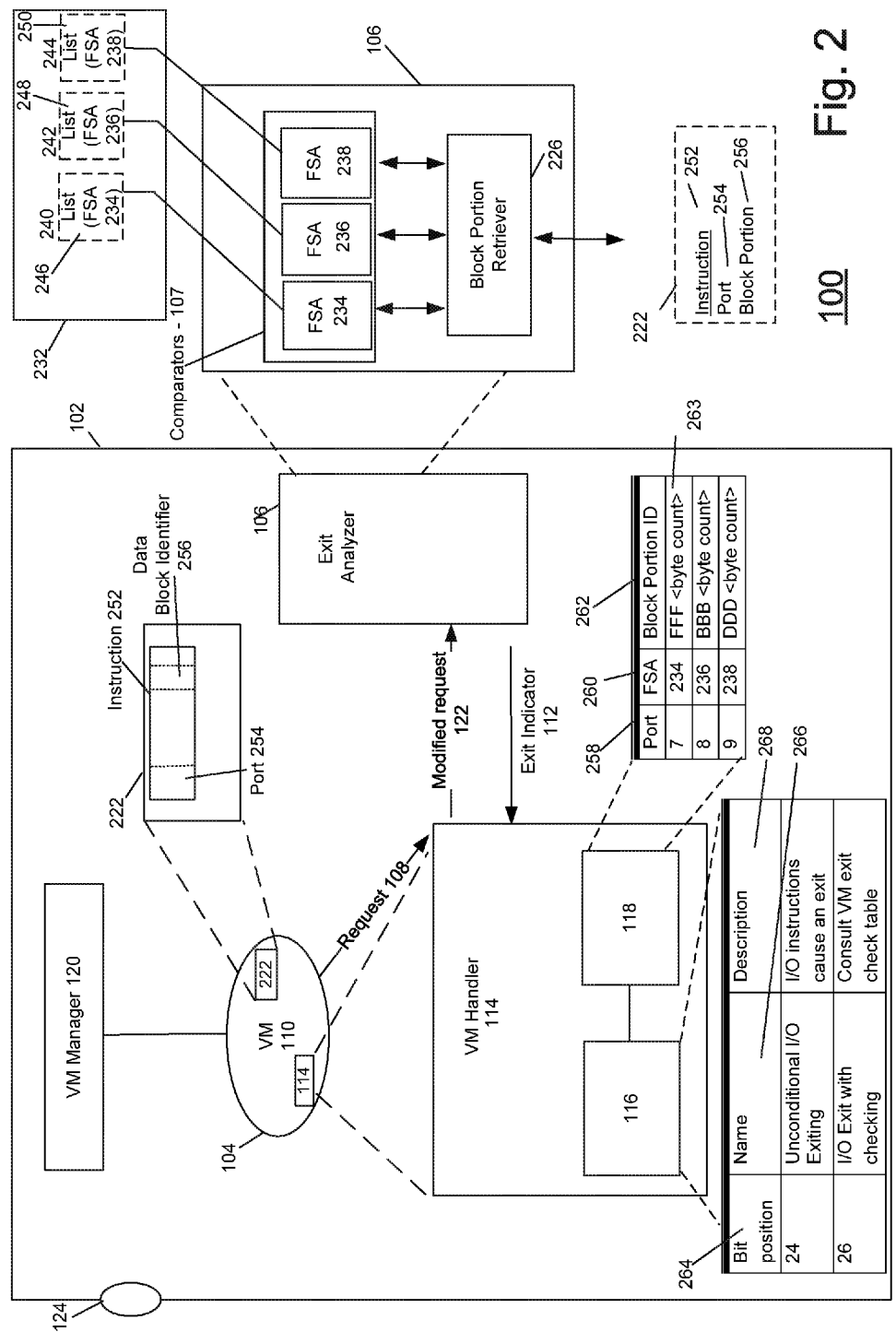
FIG. 2 depicts the example system of FIG. 1 illustrating additional details relating to an exit analyzer.

FIG. 2 illustrates the example system of FIG. 1 with additional details relating to the exit analyzer arranged in accordance with at least some embodiments described herein. Those components in FIG. 2 that are labeled identically to components of FIG. 1 will not be described again for the purposes of clarity and brevity.

In examples where virtual machine 110 generates request 108, instruction 252 relating to request 108 may be stored in a buffer 222. For example, instruction 252 may include a requested port 254, and a data block identifier 256. Data block identifier 256 may include a pointer to an address in a memory and a byte count. In an example, values identified by data block identifier 256 may include a network address. In another example, values identified by data block identifier 256 may include content requested to be written through requested port 254. Virtual machine handler 114 may compare request 108 with data in virtual machine execution table 116. Virtual machine execution table 116 may, for example, define situations where request 108 should be trapped and further analyzed to determine whether virtual machine 110 should exit core 104. For example, virtual machine execution table 116 may be a table including a bit position field 264, a name field 266, and/or a description field 268. Bit position field 264 may correspond to bit parity values in a register such as whether a particular exit analysis is enabled or disabled. Name field 266 may indicate a name of the exit analysis. Description field 268 may indicate a description of the exit analysis.

In the example illustrated, in bit position "24", an "Unconditional I/O Exiting" exit analysis may be selectively enabled. In such an exit analysis, any input or output instruction may cause a virtual machine to exit core 104 ("I/O instructions cause an exit"). In bit position "26", an "I/O Exit with checking" exit analysis may be selectively enabled. In such an exit analysis, any input and/or output request may be compared with exit check table 118 ("Consult VM exit check table").

Virtual machine exit check table 118 may include a port field 258, an FSA field 260 and/or a block portion identifier ("ID") field 262. Data in virtual machine exit table 118 may be populated by virtual machine manager 120. Port field 258 may identify values for ports 254 that may be requested in instruction 252. FSA field 260 may identify a comparator or a finite state automata engine associated with the port in port field 258. Block portion ID field 262 may include a block portion ID 263. Block portion ID 263 may include an offset, and a byte count. The offset may indicate a beginning location of values to be compared. The byte count may indicate a number of bytes to be compared starting from the offset. Block portion ID 263 may be used to locate a subset of values identified by data block identifier 256 of instruction 252. Values identified by block portion ID 263 may be compared at one or more comparators identified by FSA field 260. In the example illustrated, if instruction 252 identifies port "7", FSA 234 may be associated with that port and offset FFF plus the byte count of block portion ID 263 may be used to locate a portion of values identified by data block identifier 256 of instruction 252.

Exit analyzer 106 may include one or more comparators 107 such as finite state automata devices ("FSA") 234, 236, 238. Finite state automata devices 234, 236 and 238 may be, for example, comparators, or finite state machines configured to compare two or more values. Examples of comparators may include, hardware finite automata, (field programmable gate arrays) FPGAs, (application specific integrated circuits) ASICs or other analyzers. FSAs 234, 236, 238 may be associated with respective memory addresses 240, 242, 244 in a memory 232 such as by virtual machine manager 120. In an example, memory 232 may be part of exit analyzer 106 and/or part of one or more FSAs 234, 236, 238. In an example, FSAs 234, 236, 238 may be associated with memory addresses 240, 242, 244 by virtual machine manager 120, a virtual machine manager plug-in and/or a user.

At memory address 240 may be stored a list 246 relating to FSA 234. At memory address 242 may be stored a list 248 relating to FSA 236. At memory address 244 may be stored a list 250 relating to FSA 238. Lists 246, 248, 250 may comprise allowed values for particular virtual machines. Such lists may be conceptually thought of as "white" lists. Alternatively, lists 246, 248, 250 may comprise disallowed values for particular virtual machines. Such lists may be conceptually thought of as "black" lists. In an example where lists 246, 248, 250 identify allowed values, virtual machine 110 may write or transmit such content without requiring virtual machine 110 to exit core 104. In the example, as lists 246, 248, 250 identify allowed content, virtual machine 110 need not exit core 104 and, for example, execute virtual machine manager 120 to determine whether virtual machine 110 may access the permissible addresses. Allowed or disallowed values may also be programmed into the comparator itself, for example by arranging a finite state automata to implement an Aho-Corasick string matching state machine or by implementing an FPGA look up table.

Exit analyzer 106 may include a block portion retriever 226. Block portion retriever 226 may be hardware configured to use block portion ID 263 to fetch a subset of values identified by data block identifier 256 of instruction 252. In examples where modified request 122 relates to the values identified by block portion ID 263 matching allowed values in one of lists 246, 248, 250, exit analyzer 106 may generate exit indicator 112 indicating that an exit from core 104 is not necessary. Exit analyzer 106 may send exit indicator 112 to virtual machine handler 114. Virtual machine handler 114 may then allow virtual machine 110 to execute request 108.

In an example where request 108 relates to port "7", virtual machine exit check table 118 may identify FSA 234 as an appropriate comparator. In the example, values identified by block portion ID 263 may not match allowed values in list 246. Accordingly, exit analyzer 106 may generate exit indicator 112 indicating that an exit is necessary. Exit analyzer 106 may send exit indicator 112 to virtual machine handler 114. Virtual machine handler 114 may then instruct virtual machine 110 to exit core 104.

In another example, a virtual machine may be related to instructions used in data loss prevention. As part of the data loss prevention, a virtual machine may exchange data with other safe, known virtual machines. For example, the other safe virtual machines may be in the same server rack or may even be executed on the same hardware. The virtual machine manager may set up hardware finite automata to compare network addresses with a white list of network addresses. The virtual machine execution control table may be set to I/O exit with checking for network communication. The virtual machine exit check table may be populated to include port ranges and respective hardware finite automata programmed to compare the network addresses. The hardware finite automata may be populated with a white list of network addresses.

A virtual machine related to the data loss prevention may begin executing on a processor core. The virtual machine may generate a request to send a network message over a requested port. The virtual machine handler may trap the request and determine that the request relates to an output through a port. As I/O exit with checking is enabled in the virtual machine execution control table, the virtual machine handler may analyze the virtual machine exit check table. The analysis of the virtual machine exit check table may indicate that for the requested port, a particular hardware finite automata engine is indicated. Further, for the requested port, the block portion ID of the instruction is identified. The particular hardware finite automata may compare the values identified by the block portion ID with a white list and produce the exit indicator in response.

Among other possible benefits, a system in accordance with the disclosure may reduce the number of virtual machine exits in a computing environment. This reduction may in turn, reduce transitional latency. For example, some virtual machine exits may be avoided. A calculation to determine whether an exit is needed may be performed in 30 to 40 clock cycles—in contrast to potentially 5000 clock cycles to: exit a virtual machine, load a virtual machine manager, exit a virtual machine manager, and reload a virtual machine. Additionally, power consumption may be reduced due to fewer virtual machine exits from the core.

Figure 3:
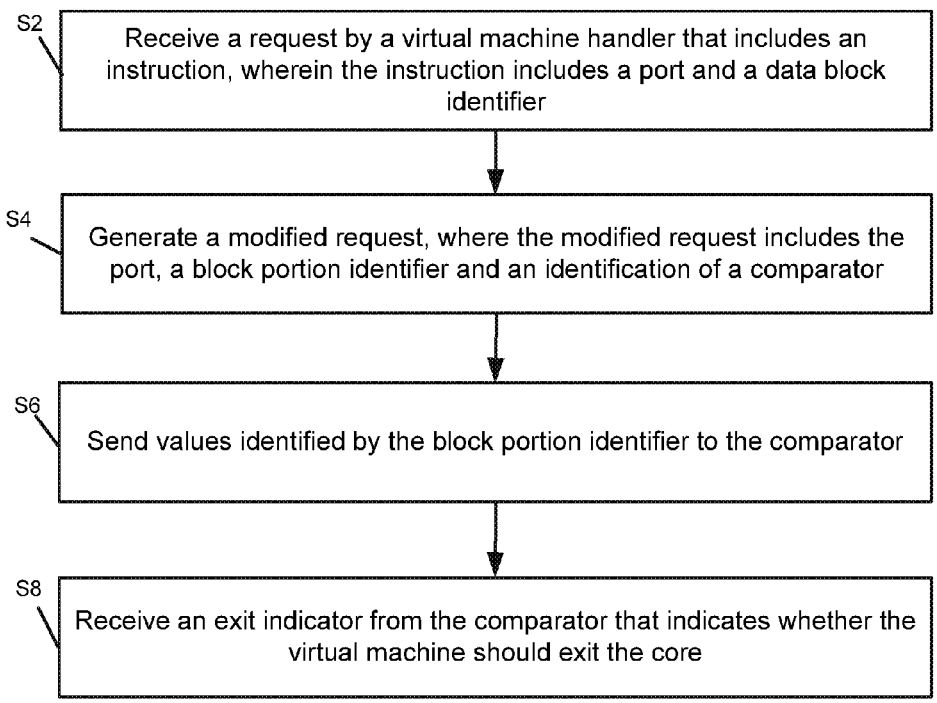
FIG. 3 depicts a flow diagram for an example process to implement a virtual machine exit analyzer.

FIG. 3 depicts a flow diagram for example processes to implement a virtual machine exit analyzer arranged in accordance with at least some embodiments described herein. In some examples, the process in FIG. 3 could be implemented using system 100 discussed above and could be used to determine whether a virtual machine should exit a core. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation.

Processing may begin at block S2, "Receive a request by a virtual machine handler that includes an instruction, wherein the instruction includes a port and a data block identifier." At block S2, the virtual machine handler may receive a request that may include an instruction, wherein the instruction may include a port and a data block identifier. In an example, a request may relate to an instruction and may be stored in a buffer.

Processing may continue from block S2 to block S4, "Generate a modified request, where the modified request includes the port, a block portion identifier and an identification of a comparator." At block S4, a modified request may be generated. The modified request may include the port, a block portion identifier and an identification of a comparator. In an example, the block portion identifier may indicate a location of values identified by the block portion identifier based on offset and a byte count. In a further example, generating the modified request may include analyzing a table to identify the comparator associated with the port. In another example, generating the modified request may include analyzing a table to identify the block portion identifier. The block portion identifier may identify a location in a memory where a subset of values identified by the data block identifier may be located. In a further example, the subset of values may be fetched from the location and provided to the comparator.

The comparator may be associated with a memory address. A hardware finite automata engine may be programmed to function as the comparator. Generating the modified request may include analyzing a table to identify the comparator associated with the port and to identify a block portion identifier. The block portion identifier may identify a location in a memory where a subset of values identified by the data block identifier is located.

Processing may continue from block S4 to block S6, "Send values identified by the block portion identifier to the comparator." At block S6, the values identified by the block portion identifier may be sent to the comparator.

Processing may continue from block S6 to block S8, "Receive an exit indicator from the comparator that indicates whether the virtual machine should exit the core." At block S8, an exit indicator may be received from the comparator. The exit indicator may indicate whether the virtual machine should exit the core. The exit indicator may be a Boolean value. In an example where the exit indicator indicates that the virtual machine should not exit the core, the virtual machine may be allowed to execute the request.

Figure 4:
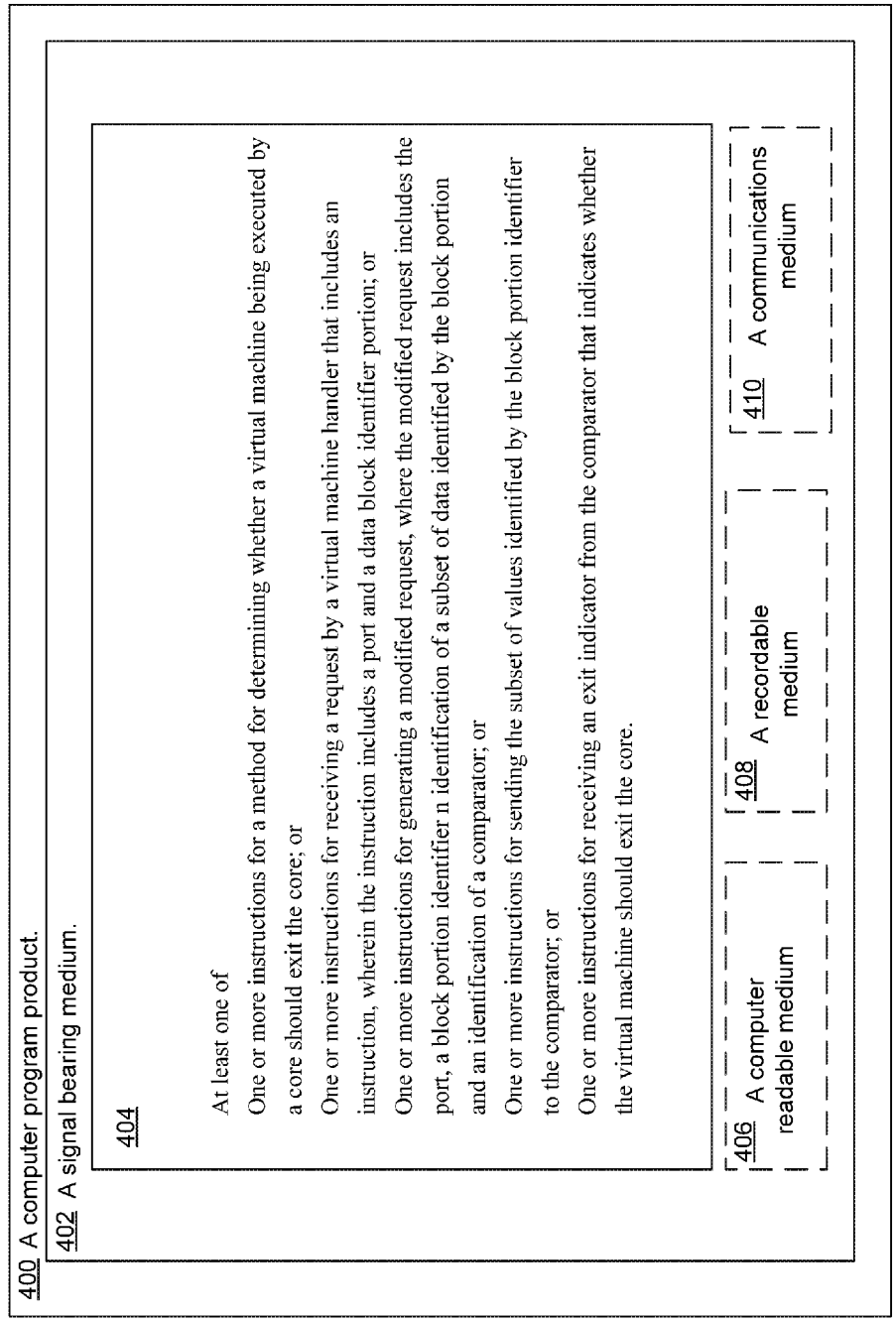
FIG. 4 illustrates an example computer program product that can be utilized to implement a virtual machine exit analyzer.

FIG. 4 illustrates an example computer program product 400 that can be utilized to implement a virtual machine exit analyzer arranged in accordance with at least some embodiments described herein. Program product 400 may include a signal bearing medium 402. Signal bearing medium 402 may include one or more instructions 404 that, when executed by, for example, a processor, may provide the functionality described above with respect to FIGS. 1-3. Thus, for example, referring to system 100, virtual machine handler 114 may undertake one or more of the blocks shown in FIG. 4 in response to instructions 404 conveyed to the system 100 by medium 402.

In some implementations, signal bearing medium 402 may encompass a computer-readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

FIG. 5 is a block diagram illustrating an example computing device 500 that is arranged to implement a virtual machine exit analyzer in accordance with at least some embodiments described herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include virtual machine handler 114 an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, one or more programmable circuits 566 and program data 524. Application 522 may include a virtual machine exit analyzer algorithm 526 that is arranged to perform the functions as described herein including those described with respect to system 100 of FIGS. 1-4. Program data 524 may include virtual machine exit analyzer data 528 that may be useful to implement a virtual machine exit analyzer as is described herein. In some embodiments, application 522 may be arranged to operate with program data 524 on operating system 520 such that a virtual machine exit analyzer may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc.

As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to determine whether a virtual machine should exit a core, the method comprising:
    receiving, by a virtual machine handler, an initial request that includes an instruction to receive data at, or output data from, a port of a processor, wherein the instruction includes an identification of the port and a data block identifier, and wherein the data block identifier includes a pointer to a memory address and a byte count;
    generating, by the virtual machine handler, a modified request from the initial request, wherein the modified request includes the identification of the port, a block portion identifier, and an identification of a comparator, wherein generating the modified request includes analyzing a table to identify the comparator, which is associated with the port, wherein the block portion identifier includes an offset and the byte count, and wherein the byte count indicates a number of bytes to be compared, by the comparator, starting from the offset;
    sending, by the virtual machine handler, values identified by the block portion identifier to the comparator;
    receiving, by the virtual machine handler, an exit indicator from the comparator in response to sending the values identified by the block portion identifier, wherein the exit indicator indicates whether the virtual machine should exit the core;
    in response to the exit indicator being indicative that the virtual machine should exit the core, exiting, by the virtual machine handler, the virtual machine from the core; and
    in response to the exit indicator being indicative that the virtual machine should not exit the core, allowing, by the virtual machine handler, the virtual machine to execute the initial request.

2. The method of claim 1, wherein receiving the exit indicator includes receiving an exit indicator that includes a Boolean value.

3. The method of claim 1, wherein generating the modified request further includes analyzing the table to identify the block portion identifier, and wherein the block portion identifier identifies a location in the memory address where the values are located.

4. The method of claim 1, further comprising storing the instruction in a buffer.

5. A method to determine whether a virtual machine should exit a core, the method comprising, by a processor:
    receiving an initial request at a virtual machine handler of the processor, wherein the initial request includes an instruction to receive data at, or output data from, a port of the processor, wherein the instruction includes an identification of the port and a data block identifier, and wherein the data block identifier includes a pointer to a memory address and a byte count;
    generating, by the virtual machine handler of the processor, a modified request from the initial request, wherein the modified request includes the identification of the port, a block portion identifier, and an identification of a comparator of the processor, wherein generating the modified request includes analyzing a table to identify the comparator of the processor, which is associated with the port, wherein the block portion identifier includes an offset and the byte count, and wherein the byte count indicates a number of bytes to be compared, by the comparator, starting from the offset;
    sending, by the virtual machine handler of the processor, values identified by the block portion identifier to the comparator of the processor;
    comparing, by the comparator of the processor, the values identified by the block portion identifier with a list of allowed values;
    determining, by the comparator of the processor, based on the comparison, that the values identified by the block portion identifier mismatch with the list of allowed values;
    in response to the determination, generating, by the comparator of the processor, an exit indicator that indicates an exit of the virtual machine from the core;
    sending, by the comparator of the processor, the exit indicator to the virtual machine handler of the processor;
    receiving, by the virtual machine handler of the processor, the exit indicator from the comparator of the processor; and
    in response to the receipt of the exit indicator, exiting, by the virtual machine handler of the processor, the virtual machine from the core.

6. The method of claim 5, wherein:
    the comparator is associated with the memory address, and
    the list of allowed values is stored at the memory address.

7. The method of claim 5, wherein:
    a hardware finite automata engine operates as the comparator,
    the hardware finite automata engine includes the list of allowed values, and
    the method further comprises, prior to receiving the initial request:
        associating the memory address with the hardware finite automata engine.

8. The method of claim 5, wherein generating the exit indicator includes generating an exit indicator that includes a Boolean value.

9. The method of claim 5, wherein generating the modified request further includes analyzing the table to identify the block portion identifier, and wherein the block portion identifier identifies a location in the memory address where the values identified by the block portion identifier are located.

10. The method of claim 5, further comprising:
    storing the instruction in a buffer;
    fetching a subset of values identified by the data block identifier from a location in the memory address; and
    providing the subset of values to the comparator.

11. A processor, comprising:
a virtual machine handler;
a core configured to be in communication with the virtual machine handler, wherein the core is effective to execute a virtual machine;
a buffer; and
a comparator configured to be in communication with the virtual machine handler,
wherein the virtual machine handler is configured to:
receive an initial request that relates to an instruction to receive data at, or output data from, a port of the processor, wherein the instruction includes an identification of the port and a data block identifier, and wherein the data block identifier includes a pointer to an address in a memory and a byte count;
store the instruction in the buffer;
generate a modified request from the initial request, wherein the modified request includes the identification of the port, a block portion identifier, and an identification of the comparator, wherein the block portion identifier includes an offset and the byte count, and wherein the byte count indicates a number of bytes to be compared, by the comparator, starting from the offset; and
send values identified by the block portion identifier to the comparator, wherein the comparator is configured to:
generate an exit indicator that indicates whether the virtual machine should exit the core; and
send the exit indicator to the virtual machine handler, and
wherein the virtual machine handler is further configured to:
receive the exit indicator from the comparator; and
in response to a determination the exit indicator indicates that the virtual machine should exit the core, instruct the virtual machine to exit from the core.

12. The processor of claim 11, wherein the comparator is further configured to:
compare the values identified by the block portion identifier with a list of allowed values; wherein the exit indicator indicates an exit of the virtual machine from the core is unnecessary in response to the values identified by the block portion identifier matching at least one of the allowed values.

13. The processor of claim 12, wherein the virtual machine handler is further configured to allow the virtual machine to execute the initial request, in response to a determination that the exit indicator indicates that the virtual machine should not exit the core.

14. The processor of claim 11, wherein the comparator is further configured to compare the values identified by the block portion identifier with a list of allowed values, and wherein the exit indicator indicates that the virtual machine should exit the core in response to a mismatch between the values identified by the block portion identifier with any of the allowed values.

15. A method for a virtual machine manager to control virtualization hardware to determine whether a virtual machine should exit a core, the method comprising:
sending, by the virtual machine manager, an initial request to a virtual machine handler, wherein the initial request relates to an instruction to receive data at, or output data from, a port of a processor, wherein the instruction includes an identification of the port and a data block identifier, and wherein the data block identifier includes a pointer to a memory address and a byte count;
controlling, by the virtual machine manager, the virtual machine handler to generate a modified request from the initial request, wherein the modified request includes the identification of the port, a block portion identifier, and an identification of a comparator, and wherein the block portion identifier includes an offset and the byte count, and wherein the byte count indicates a number of bytes to be compared starting from the offset;
controlling, by the virtual machine manager, the virtual machine handler to send values identified by the block portion identifier to the comparator;
identifying, by the virtual machine manager, receipt of an exit indicator by the virtual machine handler from the comparator, wherein the exit indicator is in response to the values identified by the block portion identifier being sent, and wherein the exit indicator indicates whether the virtual machine should exit the core; and
controlling, by the virtual machine manager, the virtual machine handler to determine whether the virtual machine should exit the core based on the exit indicator, wherein controlling the virtual machine handler comprises:
controlling the virtual machine handler to instruct the virtual machine to exit the core, in response to the exit indicator being indicative that the virtual machine should exit the core; and
controlling the virtual machine handler to allow the virtual machine to process the initial request, in response to the exit indicator being indicative that the virtual machine should not exit the core.

16. The method of claim 15, wherein:
the comparator is associated with the memory address, and
the list is stored at the memory address.

17. The method of claim 15, wherein:
a hardware finite automata engine is configured as the comparator,
the hardware finite automata engine includes the list, and the method further comprises:
associating, by the virtual machine manager, the memory address with the hardware finite automata engine.

* * * * *